United States Patent [19]

Ernstsson et al.

[11] 4,039,362
[45] Aug. 2, 1977

[54] PACKING MATERIAL THAT CAN BE SHAPED UNDER THE EFFECT OF HEAT

[75] Inventors: Georg E. Ernstsson, Staffanstorp; Birger N. Nilsson, Arlov; Herwig Pupp, Lund; Olof S. Stark, Rydsgard, all of Sweden

[73] Assignee: AB Ziristor, Lund, Sweden

[21] Appl. No.: 479,568

[22] Filed: June 14, 1974

[30] Foreign Application Priority Data

June 19, 1973   Sweden .............................. 7308581

[51] Int. Cl.$^2$ ..................... B29C 27/24; B29D 7/24; B29D 27/00
[52] U.S. Cl. ........................ 156/69; 156/85; 156/218; 156/229; 215/1 C; 264/45.9; 264/210 R; 264/230; 264/289; 264/321; 264/DIG. 71
[58] Field of Search .............. 264/53, 321, DIG. 71, 264/230, 342 R, 45.9, 46.1, 210 R, 289; 156/69, 85, 86, 229, 218; 215/1 C

[56] References Cited

U.S. PATENT DOCUMENTS

| 439,451 | 10/1890 | Ward | 264/230 X |
|---|---|---|---|
| 2,438,901 | 4/1948 | Coxe | 264/DIG. 71 |
| 2,885,105 | 5/1959 | Heyl et al. | 264/DIG. 71 |
| 3,039,911 | 6/1962 | Fox | 264/321 X |
| 3,094,449 | 6/1963 | Sisson | 264/53 X |
| 3,194,864 | 7/1965 | Richie | 264/53 X |
| 3,220,902 | 11/1965 | Edwards | 264/321 X |
| 3,248,462 | 4/1966 | Merrill et al. | 264/53 |
| 3,255,877 | 6/1966 | Kracht et al. | 264/321 UX |
| 3,384,531 | 5/1968 | Parrish | 265/53 X |
| 3,391,051 | 7/1968 | Ehrenfreund et al. | 264/53 X |
| 3,396,062 | 8/1968 | White | 264/321 X |
| 3,400,810 | 9/1968 | Makowski | 264/321 X;342 R X |
| 3,458,248 | 7/1969 | Eversole | 264/321 UX |
| 3,611,669 | 10/1971 | Shepherd | 264/321 X |
| 3,733,381 | 5/1973 | Willette et al. | 264/321 X |
| 3,734,273 | 5/1973 | Watanabe | 156/86 X |
| 3,767,496 | 10/1973 | Amberg et al. | 264/342 X |
| 3,933,959 | 1/1976 | Skochdopole et al. | 264/45.9 X |
| 3,967,991 | 7/1976 | Shimano et al. | 264/DIG. 71 |
| 3,970,492 | 7/1976 | Amberg et al. | 156/85 |

FOREIGN PATENT DOCUMENTS

| 36-8319 | 12/1963 | Japan | 264/230 |
|---|---|---|---|
| 954,069 | 4/1964 | United Kingdom | 264/45.9 |

OTHER PUBLICATIONS

Benning, Calvin J., "Plastic Foams: The Physics and Chemistry of Product Performance and Process Technology," vol. 1, New York, Wiley, Interscience, c. 1969, pp. 54–61.

Primary Examiner—Philip Anderson
Attorney, Agent, or Firm—Pierce, Scheffler & Parker

[57] ABSTRACT

A foamed plastic material of polyethylene or polystyrene capable of being heat-shaped for use in making packing containers wherein by stretching of the foam the cells therein are given a lenticular or elongated structure. In the case of a lenticular cell structure, produced by a bi-axial stretching operation, the individual cells are situated in layers in parallel planes. In the case of an elongated cell structure, produced by a monoaxial stretching operation, the individual cells are situated with their longitudinal axes in parallel planes.

1 Claim, 5 Drawing Figures

PACKING MATERIAL THAT CAN BE SHAPED UNDER THE EFFECT OF HEAT

The present invention relates to a packing material that can be shaped under the effect of heat and which consists of a web or sheet of extruded foamed plastic material of the type which has a cellular structure with closed, thin-walled cells.

In the technique of packaging more and more foamed plastic material is used as a wall material in packing containers. the advantages of foamed plastic material are that it is very light in relation to its mechanical rigidity and therefore also very cheap. A further advantage is that it is heat-insulating and can therefore be used advantageously e.g. for drinking cups for hot beverages and the like. By providing foamed plastic material of the abovementioned type with homogeneous outer coverings, the imperviousness to gas of the material can be increased at the same time as the total rigidity of the laminate is substantially improved.

It is known that foamed plastic material can be produced by blending in an extruder arrangement under high pressure a molten plastic material, e.g. polystyrene or polyethylene with a normally gaseous or liquid blowing agent of a low boiling point. At the high pressure which prevails, the blowing agent is always in liquid form and, through intensive processing, the said liquid is made to dissolve in the plastic material. When the plastic material, after the blending is extruded through a narrow slot-like nozzle which may have the shape of an elongated slot or else of an annular nozzle, the liquid dissolved in the plastic material is caused to boil when the pressure is lowered, a quantity of small bubbles thus being formed which lend the plastic material a cellular structure with closed cells. As a cell-forming agent e.g. propane gas may be used which is gaseous at ordinary pressure and temperature, but which is liquid at very high pressure, or else Freon gas or any other gas or liquid which boils at a relatively low temperature. The cell formation in the plastic material causes it to expand and to undergo an increase in thickness, and the cells formed will be substantially spherical. Such a foamed plastic material may be used in the form of a web or of cut sheets in the same manner as a cardboard material for the manufacture of packing containers, and the foamed plastic material may also be laminated with surface layers of homogeneous plastic material so as to increase the impermeability of the laminate composition.

The abovementioned foamed plastic material in the form of a web or sheet can be thermoformed only with difficulties, however, so as to form doubled up surfaces, but instead it has been necessary in principle until now to shape the material by folding. The foamed plastic material can in principle be thermoformed as such, but if in connection with the shaping it is subjected at the same time to heat and pressure, a compression of the material can easily occur owing to the cells being pressed together and the cellullar structure being disturbed locally or distorted with subsequent variations in the thickness as a consequence.

The present packing material, however, does not possess the said inconveniences but can instead be shaped to form doubled up surfaces around a mandrel without the cellular structure being disturbed or excessive variations in thickness being produced. The packing material is characterized in that the cells through stretching of the foamed plastic material are given a lenticular or elongated form, the said cells being arranged so that the lenticular cells are situated in layers in parallel planes or the elongated cells are situated with their longitudinal axes in parallel planes. The invention also relates to a method for the manufacture of the packing material, which method comprises melting the plastic material in an extrusion equipment and putting it under a high pressure, at the same time as a liquid boiling at a relatively low temperature is dissolved in the plastic melt, whereupon the plastic melt is extruded through a narrow, slot-like nozzle and the pressure is lowered, e.g. in that it is extruded into a space where normally atmospheric pressure prevails, as a result of which the liquid dissolved in the plastic mass is caused to boil to form a quantity of small gas bubbles which expand the molten plastic material and impart to the same a vesicular, cellular structure with substantially spherical cells. The method in accordance with the invention is characterized in that the web thus extruded, before it is stabilized by cooling, is subjected to a monoaxial or biaxial stretching, during which the said spherical cells are permanently deformed to elongated or lenticular shape with simultaneous molecular orientation of the plastic material.

In the following the invention will be described with reference to the enclosed drawing, in which FIG. 1 shows a section through an extrusion equipment;

Figure 1:
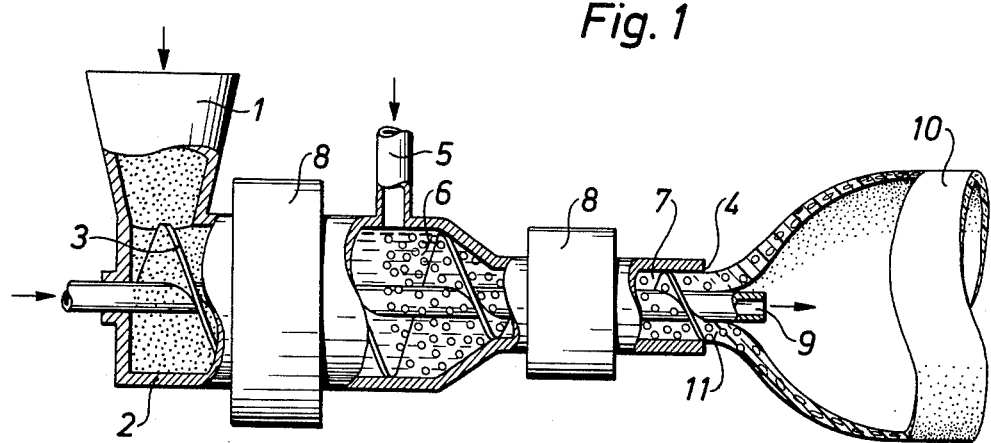

The equipment shown in FIG. 1 for the extrusion of a foamed plastic material tube comprises a hopper, through which the plastic material, which may be in the form of powder or granules, is introduced into the extruder 2, in which latter the plastic material is heated to a melt and by means of the screw 3 is put under a high pressure at the same time as it is conveyed in the direction towards the nozzle 4. Through the feed pipe 5 Freon gas, compressed to liquid form, is introduced, which compressed Freon in the chamber 6 is blended with the molten plastic material and is dissolved therein. In the outlet part 7 of the extruder a further compression and heating of the plastic melt takes place with the help of heating elements 8, whereupon the plastic mass is extruded through the annular nozzle 4 to form a tube 11, which, as a result of the drop in pressure, obtains a cellular structure owing to the Freon gas dissolved in the plastic mass being caused to boil. Immediately after the foamed plastic tube 11 has been formed, it is inflated with the help of a blow nozzle 9 which introduces a pressure gas into the interior of the tube 11, as a result of which the same is inflated to a tube 10 with appreciably greater diameter. The stretching of the tube takes place axially as well as radially, producing a so-called biaxial stretching of the material which as a result of the stretching becomes more thin-walled. The stretching may be varied through variation of the pressure gas introduced through the delivery pipe 9, and the degree of stretching may be between 50 and 500 %.

Beside the extruded packing material becoming thinner during the stretching, there occurs a deformation of the individual bubbles in the foamed plastic material, and the stretching operation ought to be carried out at such a temperature that the plastic material is molecularly orientated during the stretching. In order for such a molecular orientation to be achieved the stretching must take place at a temperature about ten degrees below the melting range of the plastic material, since if the temperature is too high no molecular orientation is obtained but only a redistribution of the molten material, whose cells, before the final setting process, reassume spherical shape. If the temperature is too low, on the other hand, it will be impossible to stretch the material without rupturing it. During the stretching of the material the initially spherical cells are deformed to lenticular or disk-like cells if the material is stretched biaxially or to oblong cells if the material is only stretched in one direction.

Figure 2:
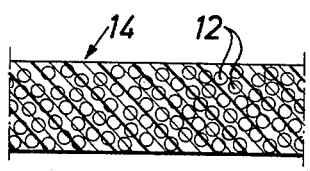
FIG. 2 shows a cross-section of a foamed plastic material produced.
Figure 3:
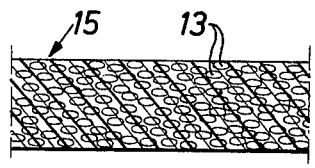
FIG. 3 shows a cross-section of a stretched foamed plastic material.

In FIG. 2 is shown schematically a cross-section of the packing material of the just extruded tube 11, whilst FIG. 3 shows a cross-section of the wall material of the inflated tube 10. The tube 10 after inflation is cut up to form a web which can either be converted to packages directly or can be cut up into sheets which are then individually processed further to form packing containers.

Beside the abovementioned process, wherein the foamed plastic material is extruded as a tube, which is then inflated, it is possible to extrude the foamed plastic material through a straight slot to produce an extruded web which web can then be stretched in the longitudinal direction of the web by passing it over a cylinder with a higher peripheral speed than the output speed from the nozzle 4.

The stretched foamed plastic material with the cell structure described above has the property that the cells endeavour to resume their spherical form when the material is heated to such a degree that it is made to soften again. Such a reversion of the cells from elongated or disk-form to spherical form involves in practice a shrinking of the material with simultaneous increase in thickness, and this shrinking effect can be used for shaping the packing material to doubled up surfaces. The heating of the plastic material in order to cause the same to shrink locally or as a whole can be done by means of radiant heat or by means of a current of hot air which is directed towards those parts of the material which are to be shrunk. In the packing material 14 shown in FIG. 2 the spherical bubbles or cells are marked 12 and in the packing material 15 shown in FIG. 3 the stretched oblong cells are marked 13. The packing material is accordance with FIG. 3 may be provided after the stretching operation with an outer layer or with a double-sided covering of a homogeneous plastic material, or else the said homogeneous plastic material can be extruded together with foamed plastic material by so-called co-extrusion where, however, a different extrusion arrangement than that shown in FIG. 1 has to be used. The said homogeneous plastic layers may be applied to the foamed plastic layer before the orientating stretching, in which case the homogeneous plastic layers too are molecularly orientated in connection with the stretching. The advantage in stretching also the homogeneous plastic layers so that they are molecularly orientated is that they will then be caused to shrink at the same time as the foamed plastic material when the whole laminate is subjected to heating. On co-extrusion of the foamed plastic layer and the homogeneous plastic layer or layers a joint orientation takes place automatically when the laminate is stretched. In case of the homogeneous plastic layers being applied in a separate covering operation, it is advantageous to stretch the foamed plastic layer by itself and to stretch the homogeneous plastic layers by themselves in connection with the covering operation, but it is also possible first to cover the unstretched foamed plastic layer with homogeneous plastic coverings and subsequently to subject the laminate to a joint stretching. In principle, any thermoplastic material may be used for the manufacture of the packing material in accordance with the invention, but for the present it is most appropriate for technical and economical reasons to use polystyrene or polyethylene for the manufacture of the packing material.

Figure 4:
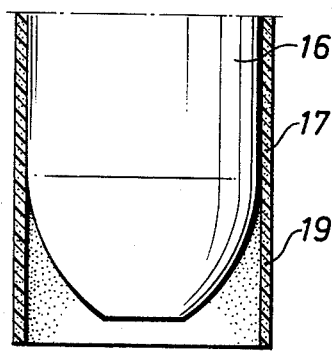
FIG. 4 shows a mandrel for the shaping of a stretched foamed plastic material.
Figure 5:
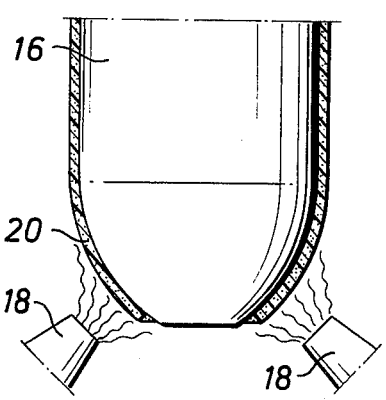
FIG. 5 shows the arrangement in accordance with FIG. 4 where a sheet of a packing material in accordance with the invention is shaped around the mandrel.

FIG. 4 shows how a sheet 17 of the packing material in accordance with the invention is wrapped around a profiled mandrel 16. The packing material sheet 17, which cannot readily be doubled up owing to the rigidity of the foamed plastic layer, is first folded to a cylinder whose edges are joined together, whereupon the cylinder 17 is applied to the mandrel 16. When the cylinder 17 made up of the packing material is applied to the mandrel 16, air is blown with the help of the nozzle 18 towards those parts 19 of the packing material 17 which are intended to be in contact with the mandrel 16. When the packing material 17 has been heated so much that the cells 13 endeavour to resume their spherical form, the parts 19 of the packing material 17 shrink and are made to come into tight contact with the mandrel 16 in the manner as shown in FIG. 5. In the case When the foamed plastic layer is provided with outer, homogeneous plastic coverings which are also orientated by stretching, the homogeneous plastic coverings too are caused to shrink together with the foamed plastic layer. The doubled up body 20 shaped by shrinking of the packing material 17 can be removed after the shaping operation from the mandrel 16, since the plastic material has been made to cool down sufficiently to be stabilized again. The body 20 that has been shaped to the desired cup shape can easily be provided with a base by fixing a flat end disk to the edge portions which have been shrunk together. It has been found that the packing material can be printed on in advance with advertising or instruction text or decorations which are not distorted too much during the shrinking operation. The distortion which does occur can be compensated by varying the size of the text on the packing material 17 and so take account of the shrinking effect. If the homogeneous plastic layer and the foamed plastic layer do not have the same shrinking characteristics, an uneven surface structure will arise along the shrunk parts of the material. By adapting the stretching and then also the shrinking capacity of the layers included in the laminate to one another it is possible, however, to obtain an even and smooth surface on the shrunk portions.

The packing material in accordance with the invention has been found to be very useful and can be shaped by shrinking within relatively wide limits.

We claim:

1. Method of making a packing container from a sheet of packing material consisting essentially of a composite web consisting of (a) a sheet of extruded foamed thermoplastic material having a cellular structure with closed, thin-walled, normally spherical cells and (b) coverings of homogeneous plastic material laminated to the opposite sides of said sheet, which method comprises the steps of stretching the composite web so that the cells of the sheet of foamed cellular material are rendered elongated or lenticular in shape and situated in parallel planes;

folding said stretched web, and joining the ends of said web together to form a tubular composite web member and placing said member about the cylindrical part of a profiled container mandrel having a cup-shaped end;

heating said member to a temperature at which said elongated or lenticular cells endeavor to resume spherical form and thereby effect shrinking of said composite web member about and in accurate contact with the profiled mandrel to form a cup-shaped article;

stabilizing the resulting shrunken cup-shaped article by cooling it while in contact with the mandrel; and thereafter separating the stabilized article from the mandrel and adding a bottom member to the stabilized article.

* * * * *